United States Patent
Homann

(10) Patent No.: US 11,230,310 B2
(45) Date of Patent: Jan. 25, 2022

(54) MONITORING OF A HORIZONTAL DAMPING ELEMENT FOR A RAIL VEHICLE

(71) Applicant: Voith Patent GmbH, Heidenheim (DE)

(72) Inventor: Matthias Homann, Braunschweig (DE)

(73) Assignee: Voith Patent GmbH, Heidenheim (DE)

( * ) Notice: Subject to any disclaimer, the term of this patent is extended or adjusted under 35 U.S.C. 154(b) by 355 days.

(21) Appl. No.: 16/193,294

(22) Filed: Nov. 16, 2018

(65) Prior Publication Data
US 2019/0152501 A1 May 23, 2019

Related U.S. Application Data

(63) Continuation of application No. PCT/EP2017/061250, filed on May 11, 2017.

(30) Foreign Application Priority Data

May 17, 2016 (DE) .................. 10 2016 208 377.5

(51) Int. Cl.
*B61L 15/00* (2006.01)
*B61G 7/14* (2006.01)
(Continued)

(52) U.S. Cl.
CPC ............ *B61L 15/0081* (2013.01); *B61G 7/14* (2013.01); *B61G 11/18* (2013.01); *G01B 7/14* (2013.01); *H02K 35/00* (2013.01); *H02K 35/04* (2013.01)

(58) Field of Classification Search
CPC ....... B61L 15/0081; B61G 7/14; B61G 11/18; G01B 7/14; H02K 35/00; H02K 35/04
(Continued)

(56) References Cited

U.S. PATENT DOCUMENTS

| 7,698,962 B2* | 4/2010 | LeFebvre ................ B61F 5/305 |
| | | 73/862.621 |
| 2006/0071658 A1* | 4/2006 | Mednikov .............. G01D 5/202 |
| | | 324/207.17 |

(Continued)

FOREIGN PATENT DOCUMENTS

| CN | 105322753 A | 2/2016 |
| DE | 10 2004 023 721 B3 | 6/2005 |

(Continued)

OTHER PUBLICATIONS

Notice of Transmission of the International Research Report and the Written Notice Issued the International Searching Authority or Declaration dated Aug. 2, 2017 for International Application No. PCT/EP2017/061250 (15 pages).

*Primary Examiner* — Peter D Nolan
*Assistant Examiner* — Luke Huynh
(74) *Attorney, Agent, or Firm* — Taylor IP, P.C.

(57) ABSTRACT

A damping element for a rail vehicle including a first section for fastening to a rail vehicle and a second section for introducing a force acting horizontally upon the rail vehicle. A monitoring system for the dampening element including a sensor attached to the dampening element for sensing a change in a distance between the first section and the second section, a data memory, a processing unit designed to determine information regarding the change in the distance and to store said information in the data memory and a local energy supply device for the autonomous supply of the processing unit.

15 Claims, 5 Drawing Sheets

(51) Int. Cl.
    *G01B 7/14* (2006.01)
    *H02K 35/00* (2006.01)
    *B61G 11/18* (2006.01)
    *H02K 35/04* (2006.01)
(58) Field of Classification Search
    USPC .......................................................... 701/19
    See application file for complete search history.

(56) References Cited

U.S. PATENT DOCUMENTS

2007/0052302 A1    3/2007   Cheung et al.
2008/0129147 A1    6/2008   Thiesen et al.
2015/0367869 A1*  12/2015   Ringswirth ......... B61L 15/0027
                                                           701/29.1

FOREIGN PATENT DOCUMENTS

JP    2008-254578 A    10/2008
WO    2010/059026 A1    5/2010
WO    2014/124848 A1    8/2014

* cited by examiner

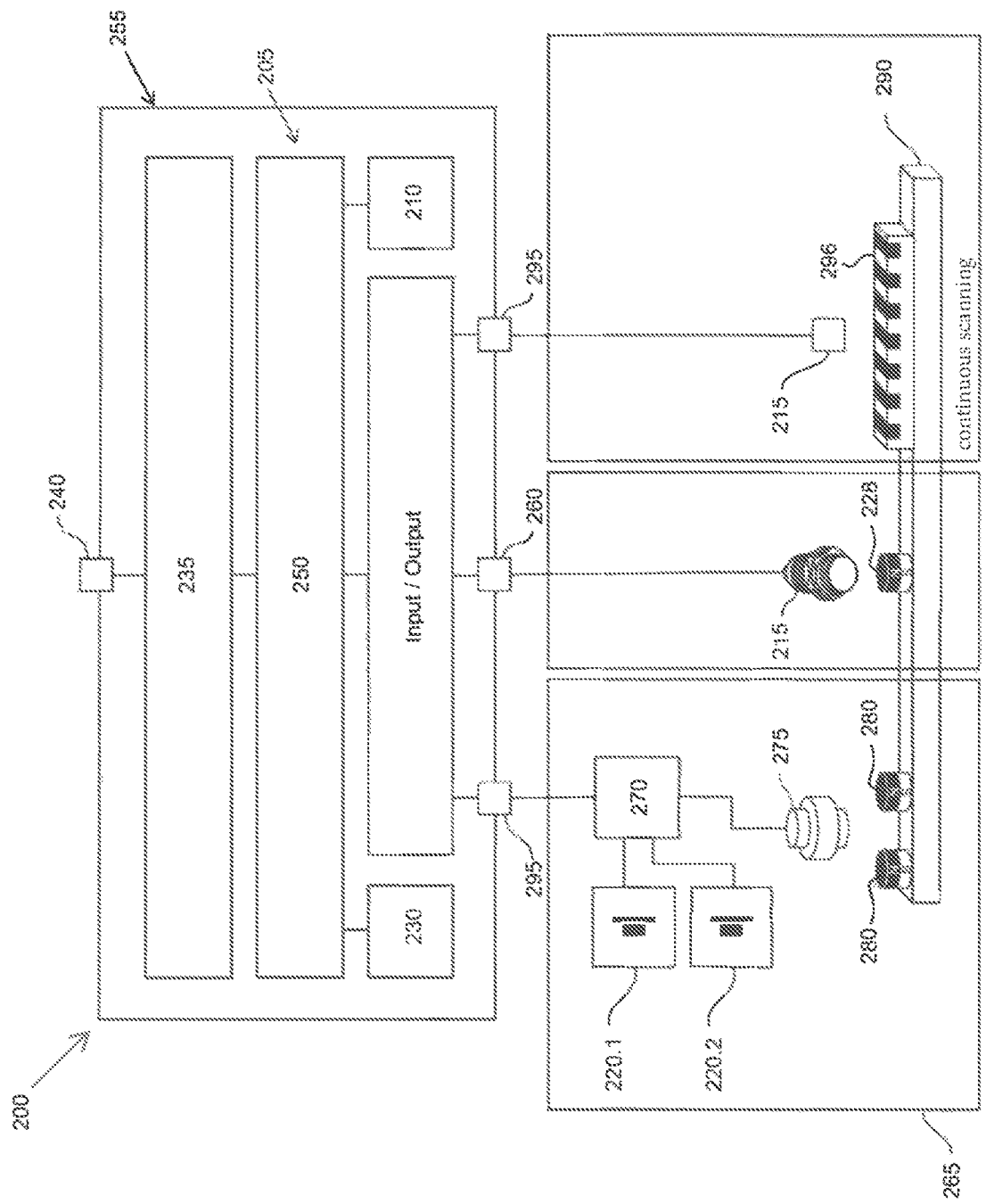

MONITORING OF A HORIZONTAL DAMPING ELEMENT FOR A RAIL VEHICLE

CROSS REFERENCE TO RELATED APPLICATIONS

This is a continuation of PCT application No. PCT/EP2017/061250, entitled "MONITORING OF A HORIZONTAL DAMPING ELEMENT FOR A RAIL VEHICLE", filed May 11, 2017, which is incorporated herein by reference.

BACKGROUND OF THE INVENTION

1. Field of the Invention

The invention relates to monitoring of a horizontally effective damping element for a rail vehicle, in particular to monitoring of a buffer, of a collision element or a coupling device to another rail vehicle.

2. Description of the Related Art

A rail vehicle, for example a locomotive, includes a horizontally effective damping or energy absorption element through which a driving or impact forces can be transferred. The damping element may be designed for coupling with another rail vehicle, for example with another locomotive or a rail carriage. The damping element may be in the embodiment of a tube that connects a coupling with the rail vehicle. In another embodiment the damping element may be designed to dampen an impact upon an object.

A multiple use damping element can be compressed or expanded any number of times. The damping can be initiated hydraulically, pneumatically or through frictional forces. A disposable damping element deforms at a predetermined load and generally does not return to its original shape but is instead replaced. To ensure reliable function of the damping element always, it must periodically be monitored for damage or wear and tear.

WO 2014/124848 suggests scanning and analyzing damping movements of a damping element.

JP 2008 254578 A relates to monitoring of damping elements between rail carriages.

WO 2010/059026 relates to a monitoring system for a motor vehicle. A movable part is coupled with a unit for energy generation which, due to the motion provides energy for operating a monitoring system and a measuring signal which points to the movement of the part.

What is needed in the art is an improved technology for monitoring of a damping element on a rail vehicle.

SUMMARY OF THE INVENTION

A damping element for a rail vehicle includes a first section for fastening to a rail vehicle and a second section for introducing a force acting horizontally upon the rail vehicle. A monitoring system for the dampening element includes a sensor attached to the dampening element for sensing a change in a distance between the first section and the second section, a data memory, a processing unit designed to determine information regarding the change in the distance and to save the information in the data memory, and a local energy supply device for the autonomous supply of the processing unit.

The monitoring system is universally usable on a damping element of any rail vehicle and can be designed so that continuous monitoring of the damping element is ensured over a long period of time. This period of time may be several weeks, months or even years. Energy saving elements for the local energy supply device can be in the embodiment of a standard small battery with perhaps one or more cells in the AA or AAA-format.

The monitoring system can thus be constructed small, light-weight and low-maintenance, so that it can be used flexibly in an improved manner. The data memory or sensor can also be operated by an energy supply device. In one embodiment the monitoring system is arranged in an interior space of the damping element where it can be better protected from environmental influences. The monitoring system can also be used without limitation on a non-electrified rail vehicle without having to be dependent upon an operating state of the rail vehicle. Monitoring of the damping element can thus be implemented on a moving or stationary rail vehicle and likewise on a coupled or de-coupled rail vehicle.

Due to the local autonomous supply of the energy supply device, the energy requirement of the monitoring system can be covered locally, and an external energy supply can be eliminated. The monitoring system can therefore be installed more easily on the damping element. A cable connection to the monitoring system may not be necessary, so that mechanical weakening of the damping element due to recesses for cable routing can be avoided. The damping performance of the damping element may remain unchanged even under high stress, for example during a collision of the rail vehicle with another rail vehicle.

In one exemplary embodiment, the energy supply device includes a generator for the supply of electrical energy based on a relative movement of the sections. In operation of the rail vehicle, mechanical energy in the form of a relative movement of the section occurs continuously with movement of the sections. This energy can be easily converted locally into electrical energy in order to drive the monitoring system for monitoring of the damping element.

The task of the damping element is generally to dampen and possibly to reduce a movement between the rail vehicle and another object. The damping element may be mounted between carriages of a train. Because of this task and because the energy that is necessary for the operation of the monitoring system is smaller by many orders of magnitude than the occurring mechanical energy, conversion of this movement into electrical energy does not disrupt the operation of the rail vehicle. The damping element is generally large and heavy and is not easy to maintain without removing it at least partially from the rail vehicle, the result of which could be at a considerable expense. The monitoring system can operate autonomously for a longer time period with the assistance of the generator, so that the monitoring system can be low-maintenance or maintenance free. The monitoring system can be mounted on or in the damping element.

Supply of electrical energy with a generator is also known as energy-harvesting. The supply may be designed separately from the sensor for determination of the relative movement. The sensor can thus be constructed as reliably as possible, whereas the generator can be constructed as efficiently as possible. In this way the different demands can be better met.

The generator may be arranged for inductive conversion of mechanical energy into electrical energy and include a coil that is arranged for installation on the first element and a magnet that is arranged for installation on the second element. The magnet may include a permanent magnet and the coil may be dimensioned such, that on an expected relative movement, for example when the damping element is mounted between individual carriages of a train and the drive is being driven in a predetermined manner, sufficient electrical energy can be converted for operation of the monitoring system. The available energy can be controlled by a number or strength of magnets or a number of turns of coils. The inductive generator can be constructed robustly and insensitive to noise. Standard components may be used for the construction.

The sensor can be arranged for determination of a magnetic field and for installation on the first element, wherein a magnet can be provided that is designed for installation on the second element. A magnet that influences the sensor and a magnet that is included with the generator can be structurally identical. Under certain operational conditions, the same magnet can serve to operate the sensor or to influence the coil.

The sensor system can include a first carrier element on which at least one coil and at least one sensor are mounted, wherein the first carrier element is designed for installation on one of the elements. The sensor, the coil and the first carrier element can be individually manageable units and can be installed easier, faster and more precisely on the damping element, maintained or removed from same.

A second carrier element may be provided on which at least one magnet is mounted, wherein the second carrier element is designed for installation on one of the elements. Here to, an individually manageable unit can be provided with improved installation or removability.

Several magnets and several coils may be provided, wherein relative distances between the magnets are disparate to relative distances of the coils in direction of movement of the elements. In particular, the magnets and coils can respectively be mounted along a direction of movement in such a way that at least on a predetermined actuating path always only one distance between a coil and a magnet is negligible. In other words, minimum distances between magnets and coils can be adjusted successively on different coils. Thus, a voltage induced at the coils can be held more consistently over the movement and the build-up of voltage peaks which can be difficult to manage in the operation of the monitoring system can be reduced.

An energy accumulator may be included which is designed to temporarily store energy that is supplied by a generator. Over a period of time, the energy accumulator can compensate varying energy rise or fluctuating expenditure by the monitoring system. In addition, a period of missing energy harvesting can be bridged by the energy accumulator. In another exemplary embodiment, a rechargeable and a disposable energy accumulator is provided. The disposable energy accumulator can provide improved energy over a longer period of time, for example over several years, in order to ensure at least an energy-saving minimum operation of the monitoring system when the generator is not operational, and the rechargeable energy accumulator is depleted.

A converter can be provided that is designed to process the electrical energy is provided by the generator. Processing may include adaptation of current, voltage, polarity and ripple. The monitoring system can include an energy-saving and electrically sensitive, component, a microcomputer or microcontroller.

The damping element may be designed to degrade in a predetermined manner having an energy altering the distance of the sections. In one exemplary embodiment, the damping element is designed for absorption of transmission forces to another rail vehicle. The damping element can be integrated with a connecting tube between a coupling, i.e. a Scharfenberg coupling, and a chassis of the rail vehicle. In another exemplary embodiment, the damping element may act as a buffer or is connected with a buffer, to dampen an impact between the rail vehicle and another rail vehicle or a stationary object.

The damping element can be designed for regenerative damping, wherein an introduced force is stored and is returned in a reverse direction. The damping element can include a flexible spring element. The damping element may also be designed for destructive damping, wherein the absorbed energy is not returned in the form of a movement but is converted into another energy form such as heat or deformation energy. Predominant destructive damping elements can also be referred to as crash box, crash buffer or crash element. Damping can generally be effected, for example hydraulic, pneumatic, or friction devices or by deformation, bursting or tearing of an element located in the power train. An actual damping element generally implements a predetermined hybrid form consisting of destructive and regenerative damping. An analysis of the damping behavior of the motion damper can occur based on the stored data. Thereby, a proper state of the motion damper can be ensured. Through comparison of corresponding information of motion dampers on various rail vehicles, a behavior of the motion dampers can be statistically analyzed. In the event of an accident of the rail vehicle, an analysis of the accident event can be facilitated based on stored information. The stored information can also be available long after it was originally stored.

The sensor may provide a binary signal that changes when the distance between the first and the second section changes. The binary signal can be produced by a passive sensor that has no energy expenditure of its' own, if the binary signal assumes a predetermined level (as a rule LOW or 0). If the damping element is in an idle position, if the force acting upon the element is below a predetermined threshold value the sensor provides said predetermined level. The energy expenditure of the monitoring system can thereby be very low, so that an operating life of the monitoring system can be extended. A sensor of this type can include for example a switch, i.e., a magnetic switch, which when leaving the idle state, produces an electrical connection to the energy supply.

The processing unit may include an interrupt input to which the binary signal is fed, whereby the processing unit is designed to move due to an interrupt from an idle state into a processing state in order to process the information.

The processing unit can be designed as a programmable microcomputer or microcontroller. The processing unit can herein support two or more operational states which differ in processing capacity and power consumption. In an energy-saving idle state, the processing unit can have an energy expenditure of only a few micro ampere ($\mu A$), for example approximately 0.4 $\mu A$ when using a microcomputer from the MSP430 family. The microcomputer can change into a lesser power-saving processing state when a signal to an interrupt input assumes a predetermined level (level-controlled interrupt) or if the level at an interrupt input has a falling or rising edge (edge-controlled interrupt). In a processing state the sensor can be scanned, and the information can be identified or stored. If no changes of the sensor signals are recorded over a time span longer than the predetermined time period, the idle position can again be assumed.

In another exemplary embodiment, a damping constant of the damping element is different on sections of the distance, wherein the sensor is designed to sense when a distance section is exceeded. Exceeding of the equivalence regions in which the damping element behaves consistently can be captured. For example, a first equivalence region may be allocated to a standstill of the rail vehicle, a second to a drive mode, a third to a permissible peak load and a third to a damaging peak load. A different damping constant of the damping device may be allocated to each equivalent region. Lifespan or functional capacity of the damping element can depend on the operation of the damping element in the various equivalent regions, so that by determining in which equivalent region the damping element is operated in which manner, an improved control over the general operational capability of the damping element can be facilitated.

Two binary (digitally bivalent) sensors may be provided, whose distance-dependent signals are out-of-phase, wherein the processing unit is designed to determine a direction of motion of the sections based on the signals of the sensors.

Using two binary sensors, four different distances of the sections of the damping element can be distinguished. By considering the sequence of the transitions of the signals of the sensors, a tensile load and a shear load of the damping element can be determined and can be monitored separately from each other.

The monitoring system may also include a timing unit, wherein the processing unit is designed to define information regarding a speed or a point in time of the change of distance and to store such in the data memory. The timing unit can indicate a relative time between occurrences, for example a change of the level of a sensor, in any given unit in the form of a count of a used frequency standard. The timing unit may also provide an absolute time, for example as a combination of a date with detail in respect to hours, minutes and seconds, so that a chronological correlation of information with an external occurrence can be facilitated. Such an occurrence can include information regarding a damping element of another rail vehicle which can be coupled with the first rail vehicle. The timing unit can also support different energy modules, so that the energy expenditure of the monitoring system can be increased only insignificantly due to the continuously running timing unit. In order to provide current timing information, the timing unit can be transferred from an idle state into a processing state.

In yet another exemplary embodiment, the monitoring system may include a communication device to provide information stored in the data memory at an interphase, wherein the communication device can be deactivated independently from the processing unit. By separating the external provision of stored information from its' creation or respectively saving, the energy consumption of the monitoring can be further reduced. The monitoring system can be designed to either scan information or to provide same via the communication device. The communication device can be designed to provide a data exchange with predefined protocol that is generally used by another component on board of the rail vehicle, for example CANopen.

The monitoring device can support at least two operational states with different energy expenditures wherein a transition between the operational states occurs subject to a signal from the sensor. The operational state having the lower the energy expenditure can for example be abandoned automatically when a certain sensor signal is given. An operational state having a higher energy expenditure is assumed where a higher processing capacity is allocated, whereby the sensor signal can be evaluated more precisely or more frequently. Thus, energy can be saved during a period in which a deformation of the damping element is minimal, and in the event of a significant deformation a precise measurement can be quickly performed.

A process for monitoring a damping element on a rail vehicle, wherein the damping element includes a first section mounted on the rail vehicle and a second section for introducing a force acting horizontally on the rail vehicle, having following steps: capturing a sensor signal indicating a change in a distance from the first to the second section, defining information in regard to the change in the distance, and storing of information in a data memory.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 5 shows another embodiment of a monitoring system for a damping element.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1A:
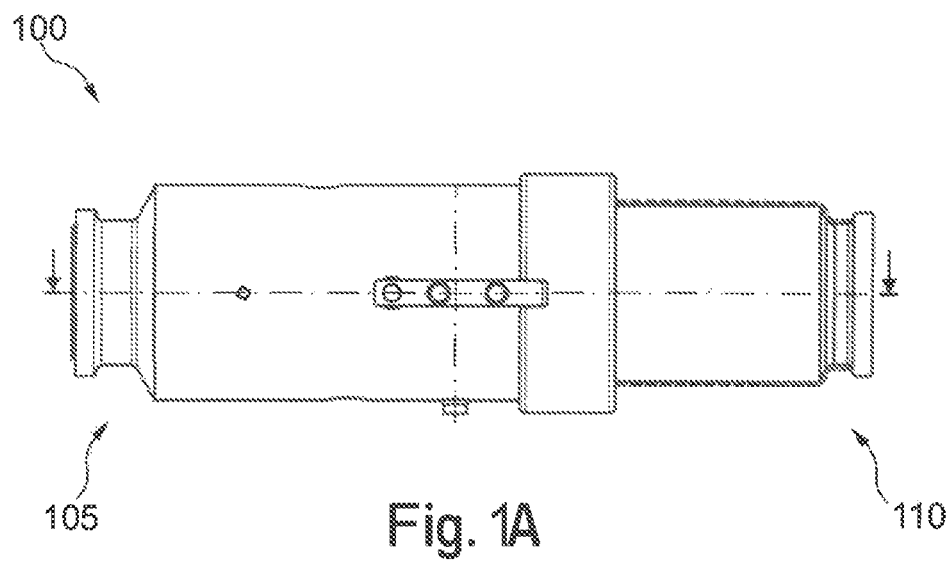
FIG. 1A shows an embodiment of a damping element for a rail vehicle.
Figure 1B:
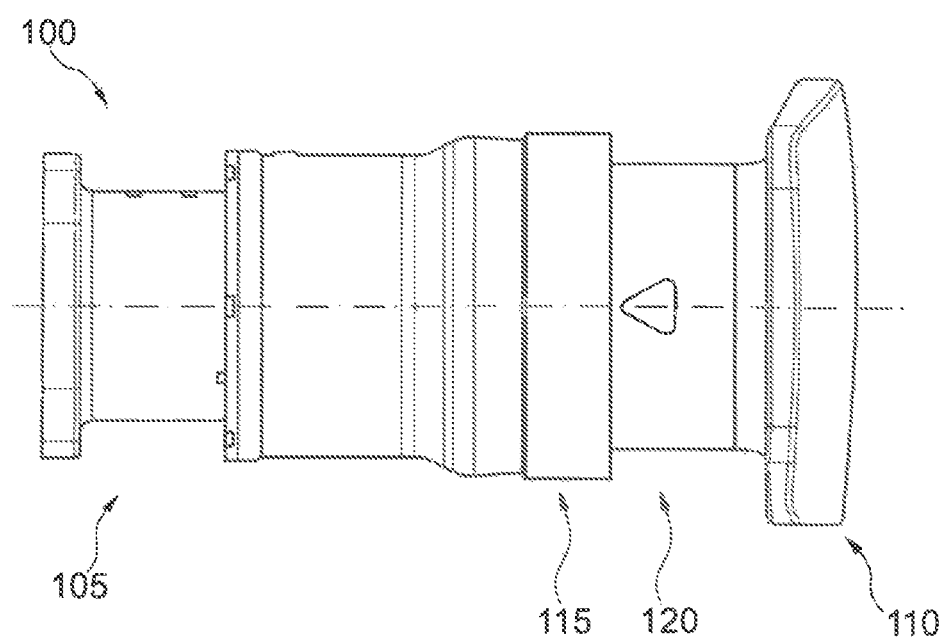
FIG. 1B shows another embodiment of a damping element for a rail vehicle.

Referring now to the drawings, and more particularly to FIGS. 1A & 1B, there are shown two exemplary damping elements 100 for a rail vehicle such as a locomotive or a rail carriage. Damping elements 100 are designed for transmission of essentially horizontally acting forces and respectively include a first (proximal) section 105 for fastening on the rail vehicle and a second (distal) section 110 for introduction of a force. In addition, a flexible spring system can be implemented for damping between sections 105, 110.

In FIG. 1A, damping element 100 is arranged as a coupling rod for use between a coupling, in particular a Scharfenberg coupling and a rail vehicle or its chassis. A joint can be provided between second section 110 and the rail vehicle. Illustrated damping element 100 may be predominantly regenerative and can also implement damping based on a hydraulic or a frictional force. From a no-load standard position, damping can act in a pull direction or a push direction, or in both directions with same or different strength. The coupling may be arranged for connection with another rail vehicle. Forces in the range of several 100 kN to more than 1000 kN can for example be transmitted via the damping element.

In FIG. 1B, damping element 100 may be designed as a buffer or a side buffer. The first section 105 on the left is designed for mounting on the rail vehicle, whereas second section 110 may be a buffer stop that is designed for impact with another buffer or another object against which the rail vehicle impacts. Between first section 105 and second section 110 an arrangement of annular springs may be provided for predominantly destructive damping.

A third section 115 is located between sections 105 and 110 which is connected to the second section 110 with a deformable section 120. Third section 115 herein assumes the function of first section 105 described above. In the illustrated embodiment, deformation of region 120 occurs only if an available damping path of first section 105 relative to third section 115 has been exhausted. In another embodiment, damping element 100 only includes a destructive damping element which can be a box or other structure. Additional combinations of regenerative and destructive damping elements 100, serial or parallel, are also possible. For monitoring of a damping element 100, a monitoring system may be used that can scan a damping motion of sections 105, 110 as autonomously as possible and over a longer period of time and save same in a data memory.

Figure 2:
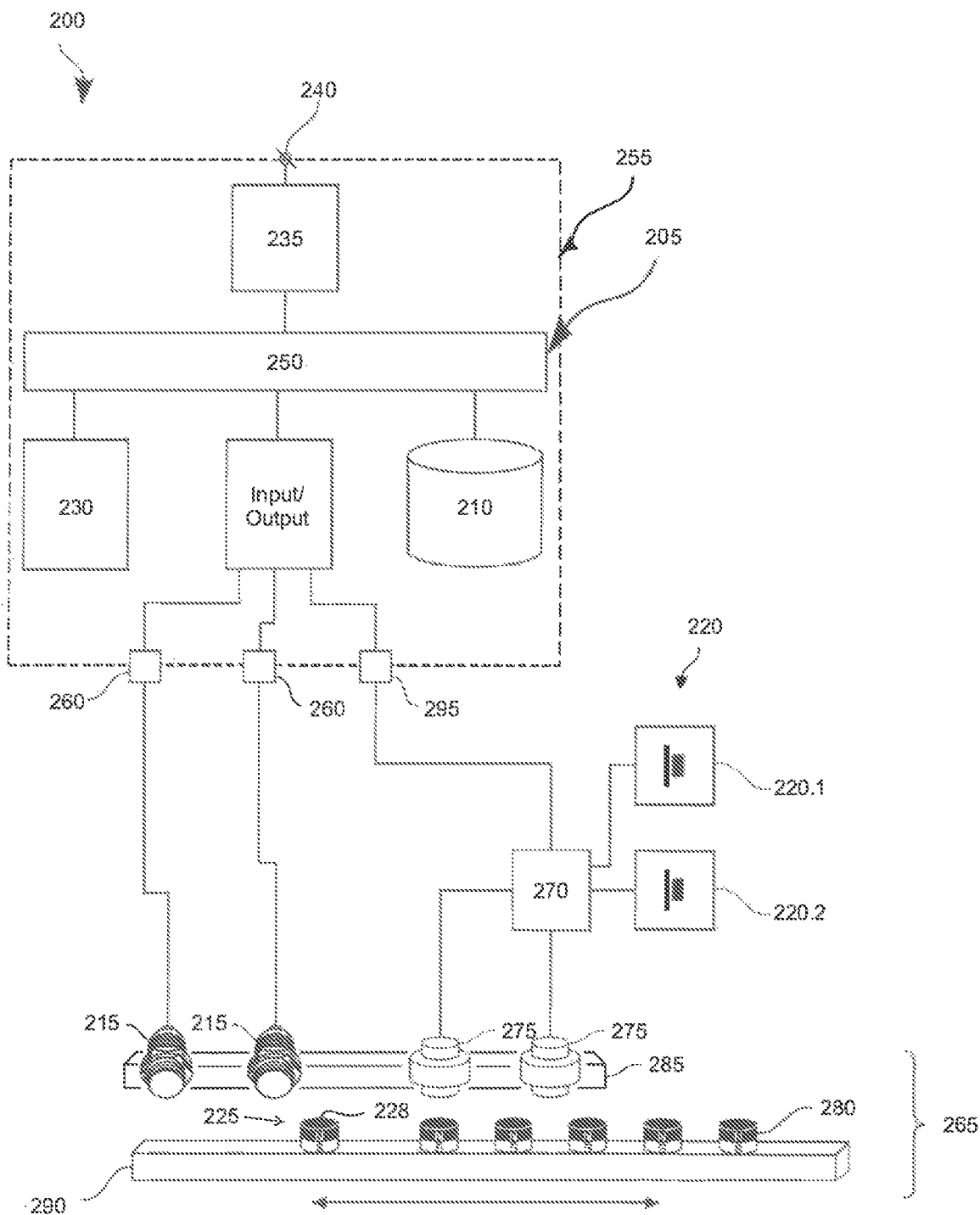
FIG. 2 shows an embodiment of a monitoring system for a damping element.

FIG. 2 illustrates a monitoring system 200 for a damping element 100 as show in FIG. 1A & 1B. Monitoring system 200 includes a processing unit 205 which can be a programmable microcomputer, a data memory 210, one or several sensors 215 and an energy supply device which can be an energy accumulator.

Data memory 210 can include a semiconductor memory that retains the stored data, with or without an energy supply. In one exemplary embodiment, several cascading data storage units are provided which can be different in design and storage capacity. A first data memory 210 can be rapidly responsive, have low capacity and can lose its data without energy supply. A second data memory 210 may be slower to respond, have a greater capacity and may retain its data even without an energy supply.

A sensor 215 may be arranged to capture a change in the distance of a first section 105 from a second section 210. The distance may be explicitly defined, or a change of the distance may merely be sensed. Sensor 215 may be used permanently in the harsh environment of damping element 100. For this purpose, sensor 215 can for example be arranged in a M30 screw housing. In one exemplary embodiment, sensor 215 is arranged to provide a binary signal having at least one switch that is either open or closed.

Sensor 215 may include a magnetic switch that changes its position subject to a magnetic field. Sensor 215 may be located at one of the sections 105, 110 and a magnetic element 225 may be located at the other section 105, 110. Magnetic element 225 may include one or several magnets 228. An expansion of magnetic element 225 along the relative direction of movement of sections 105 and 110 can be adapted to a distance of sensors 215 along the same direction, so that a predefined phase position of signals of sensors 215 occurs. More than two sensors 215 or more than one magnetic element 225 can also be provided. In another exemplary embodiment, sensor 215 can also sense a dimension other than a magnetic field, for example an optical marking or a physical actuating device for a switch of sensor 215.

In yet another exemplary embodiment, sensor 215 may be designed for a digitally bivalent signal or an analog signal that always indicates a distance or a change in distance of sections 105, 110.

Monitoring system 200 may include a timing unit 230, i.e. a free-running counter, capture/compare unit (CAPCOM) or real timing unit. Timing unit 230 provides a timing signal in which a space in time between occurrences, in particular changes of a signal of sensor 215, can be captured.

Monitoring system 200 can moreover include a communication device 235 that is designed to exchange data via an interphase 240. Interphase 240 can follow a predefined standard for data exchange, for example CANopen, and maybe independent from processing unit 205. For the communication of processing unit 205 with communication device 235, a driver module for separation can be provided. Communication device 235 can be designed to prompt processing unit 205 to transmit data from data memory 210. For this purpose, the processing unit can be moved from an idle state into a processing state, for example by an interrupt prompt. Communication device 235 can be implemented as an independent programmable microcomputer or can be included together with processing unit 205 by a microcontroller 255. Microcontroller 255 can include data memory 210, timing unit 230 or driver module 245, as illustrated in the example in FIG. 2. Moreover, parts or all components of monitoring system 200 can be combined into one system (system on chip (SoC)) in order to facilitate optimization regarding cost, space requirement and energy efficiency, etc.

Sensor 215 may be joined via a connection, i.e. an interrupt input 260, with processing unit 205 or microcontroller 255. If the level at interrupt input 260 corresponds with a predefined value (0 or 1), or if the level changes in a predefined manner (increasing from 0 to 1 or decreasing from 1 to 0) an interrupt prompt is sent to processing unit 205, whereupon its activity is interrupted, and the interruption is responded to. Processing unit 205 can thus in an event-driven mode scan information regarding a change in distance of sections 105 and 110 from sensor 215, process same and save it in data memory 210.

Information that describes a damping path of damping element directly or indirectly may be saved in data memory 210. The information may be identified with relative or absolute time information. The damping path saved according to time can also be saved as a speed information. In addition, system parameters of monitoring system 100 can be saved in the data memory in order to allow subsequent analysis of the functional capacity of monitoring system 200 at the time of a movement of damping element 100.

Processing unit 205 or microcontroller 255 can separate different energy states. A first energy state is referred to as idle state and requires only little energy from the energy supply unit. However, it normally only permits slow or no processing of information. In addition, a peripheral element, for example a timing unit 230, many be partially or completely deactivated. A second energy state is referred to as processing state and typically requires a greater energy expenditure, permits faster information processing and can activate one or several peripheral elements. A transition from the first into the second energy state can occur when an interrupt is triggered, because sensor 215 supplies a relevant signal at interrupt input 260. A transition from the second into the first energy state can occur in a program-controlled manner.

In an exemplary embodiment, the energy supply device includes a generator 265 which is designed to convert a mechanical relative movement of sections 105, 110 into electrical energy so that monitoring system 200 can be operated with the harvested energy. Generator 265 may work inductively and include at least one permanent magnet 280 which is mounted to one of the sections 105, 110, and at least one coil 275 which is mounted on the other section 105, 110. One converter 270 can be provided in order to adapt the electric energy that is supplied by generator 275, regarding voltage, current, polarity or ripple. The converter can include a Zener diode, a linear regulator or a DC converter and can be designed to supply electric energy at a predetermined DC voltage.

Magnet 280 has a longitudinal axis extending between a magnetic north pole and a magnetic south pole. Magnet 280 may be mounted on allocated section 105, 110 in such a way that its longitudinal axis is aligned substantially perpendicular to the relative direction of movement of sections 105, 110. Coil 275 also has a longitudinal axis extending between their magnetic poles when a current flows through coil 275. Coil 275 may be oriented such, that its longitudinal axis progresses parallel to the longitudinal axis of a corresponding magnet 280. Coil 275 and magnet 280 are herein facing each other axially so that the longitudinal axes are substantially aligned with one another when sections 105, 110 are pivoted in such a way that a distance between coil 275 and magnet 280 is minimal.

Several coils 275 and/or several magnets 280 may be provided in order to take advantage of a larger path of elements 105, 110 for energy generation. By using several coils 275, the energy provided by generator 265 can be increased with a predefined relative movement of section 105, 110. If several coils 275 and several magnets 280 are used, coils 275 can be arranged along a first straight that runs parallel to the relative direction of movement of sections 105, 110 and magnets 280 can be arranged along a second straight parallel thereto. In an exemplary embodiment two respectively adjacent magnets 280 are oriented the same way regarding their magnetic poles. In another exemplary embodiment, magnets 280 are oriented magnetically alternating, so that a coil 275 passing magnets 280 alternately faces a north pole and a south pole. A magnetic flow can be produced between adjacent magnets 280 by a magnetic conductive element. Such a conductive element, for example a baffle plate or a package of baffle plates, can be arranged on magnets 280, in the region of the magnetic poles which are facing away from coils 275. A corresponding magnetic baffle plate can be provided between adjacent coils 275.

It is preferred that, in the direction of movement of sections 105, 110, coils 275 have other relative distances than magnets 280, so that during a relative movement different coils 275 consecutively have a respectively smaller distance to a magnet 280. In one embodiment, along one section having uniformly spaced coils 275 N+1 or N−1, uniformly spaced magnets 280 are arranged. Additional magnets with the same distances can be arranged outside the section. Due to the displacement the supplied electric energy can be distributed more uniformly over the path or the time.

The electric energy that is supplied by generator 265 may be subject to the relative rate of motion of magnets 280 relative to coil 275 and thus subject to the relative rate of motion of sections 105, 110. The faster this movement occurs, the greater the voltage induced on coil 275. Converter 270 may be designed to rectify the induced voltage, for example by a bridge rectifier, to limit or increase it to a predefined level that is useful for the operation of monitoring system 200. The level of the usable voltage is generally determined by a semiconductor and can be approximately 12V, approximately 5V, approximately 3V or approximately 1.3V. Converter 270 may be temporarily store electric energy supplied by generator 265 in energy accumulator 220. For this purpose, generator 265 can control a charging current of energy accumulator 220, if it is a chemical energy accumulator such as a Li-Ion or a NiMh-accumulator. Also, a release of electrical energy from energy accumulator 220 can be controlled by converter 270. In another exemplary embodiment, separate converters 270 are provided for charging and supply of energy from energy accumulator 220.

Another embodiment provides a first chargeable energy accumulator 220.1 which can be charged by generator 265, and a second non-chargeable energy accumulator 220.2, i.e. a mercury battery, zinc-carbon battery or alkaline-manganese battery. First energy accumulator 220 can include an accumulator or a capacitor, a double-layer capacitor, a super-capacitor or an ultra-capacitor. Converter 270 can control the supply and harvesting of energy in such a way that electrical energy is taken directly from generator 265. If the energy from generator 265 is insufficient, energy can be taken additional to or alternatively from energy accumulator 220.1. If this energy is also insufficient additional energy be taken from second energy accumulator 220.2. In this way, monitoring system 200 can still be operated if generator 265 is not functional and first energy accumulator 220.1 is depleted. This can occur, because damping element 100 on which monitoring system 200 is mounted is located at the very front and back ends of a rail vehicle, or because the rail vehicle is parked.

Generator 265 can be established independently from the remaining monitoring system 200 and can optionally be located removed from same. In another exemplary embodiment, generator 265 is included in monitoring system 200 and can also be integrated in same. At least one of the energy accumulators 220 can be allocated to generator 265 and located spatially close to generator 265. One of the energy accumulators 220 can also be allocated to the monitoring system and can be located spatially close to same. In one embodiment, generator 265 together with converter 270, first energy accumulator 220.1 or second energy accumulator 220.2 is arranged to optionally supply electric energy to an additional electrical system. An interphase 295 can be provided for connection of electrical consumers.

Sensors 215 and coils 275 may be influenced by a permanent magnetic element 228, 280. In one embodiment, the same magnet or magnets 280 can be arranged to pass by coils 275 and sensors 215, when elements 105 and 110 move relative to one another. Magnetic element 225 described above can include one or several magnets 280. Magnet 280 may be mounted to element 105, 110 in such a way that it is located without compression load of damping element 100 in the region of coils 275, but not yet in the region of sensors 215. Even at a relatively small deflection of elements 105, 110, an electric current can be induced in coil 275 without sensor 215 changing its switching state. Only when the deflection of elements 105, 110 reaches a predefined measure, can magnet 280 get into the region of sensor 215, so that it changes its output signal. An additional magnet may be positioned in this location in the region of a coil 275, so that the generation of electric energy can be maintained.

One or more sensors 215 and/or one or more coils 275 can be mounted on a first carrier element 285 which can be fastened on one of the elements 105, 110. Accordingly, one or more magnets 280 can be mounted on a second carrier element 290 which can be fastened on the other element 105, 110. The relative arrangement of coils 275 or magnets 280 can thus be determined already prior to their mounting on damping element 100. Maintenance or replacement of magnets 280 or coils 275 can be simplified. Additional components of monitoring system 200 can be mounted on one of the carrier elements 285, 290. The entire monitoring system 200 can therein be realized as one or two manageable units. In one embodiment, sections 105, 110 include tube sections, concentrically stretched in each other and monitoring system 200 can be arranged inside one of the tube sections. Due to the local autonomous energy supply and possible data memory 210 or a wireless interphase 240, the monitoring system can be installed in the hermetically sealed damping element.

Figure 3:
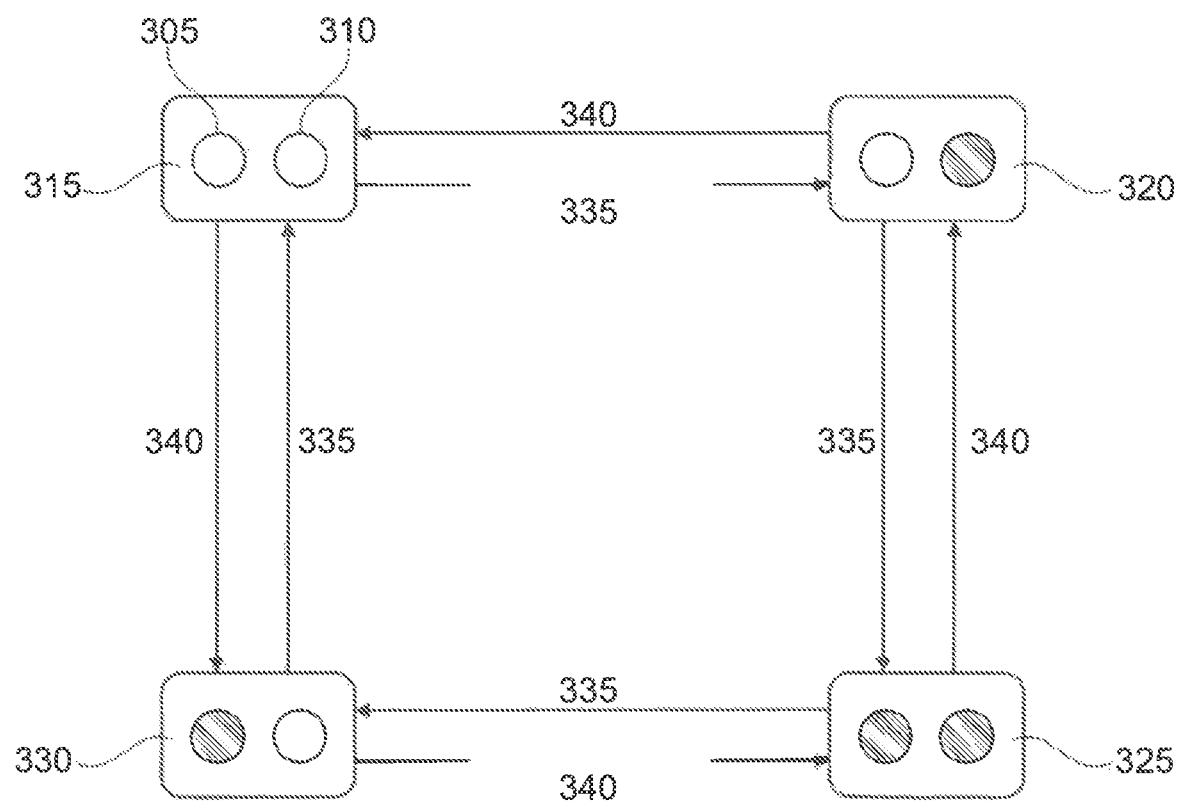
FIG. 3 shows a process diagram of a method for monitoring a damping element.

FIG. 3 shows a process diagram of a process 300 for monitoring a damping element 100 as illustrated in FIG. 1. Process steps are shown as transitions between states 315, 320, 325 and 330. An arrangement of two sensors 215 as shown in FIG. 2 is assumed. In each state, output signal 305 of a first sensor 215 and output signal 310 of a second sensor 215 are illustrated. Depending on if a signal is captured or whether the individual signal states are only characterized by different levels, a light circle illustrates the signal that is not captured or respectively the low-level signal and a dark circle symbolizes the captured signal or respectively the high-level signal.

Initially, method 300 is for example in a first state 315 in which both output signals 305, 310 are either signals that are not captured or low-level signals. However, if a signal is present or if first output signal 305 changes its level, process 300 transitions into state 330. This corresponds to a first state transition in the form of a transition step 335 counterclockwise, which can for example indicate a compression of damping element 100. An additional compression changes output signals 305, 310 in such a way that additional state transitions occur in transitional steps and the states 325 and 320 are thus cycled through.

With each transitional step 335, 340 characterizing a state transition, information regarding the movement of damping element 100 can be determined and saved in data memory 210. A determination may be made about how significant the movement of sections 105, 110 is. A direction of movement of sections 105, 110 may also be determined based on the sequence of cycling through states 315-330 and saved in data memory 210. Based on the length of the determined movement and with the assistance of an acting spring force of damping element 100, the actuating force or actuating energy can also be established and saved. To determine same, a damping of damping element 100 may also be considered, for which a rate of motion of sections 105, 110 can be considered.

The rate of motion can be determined based on time periods between achieving states 315-330 and the geometry of the arrangement of sensors 215 and element 225 on damping element 100. If the distance of sensors 215 is for example 30 mm along the direction of movement and if between achieving state 320 and achieving state 325 there is a time of 0.5 seconds, then the rate of compression of damping element 100 in this region is 60 mm/s. Rates of motion between the other transitions can be determined accordingly.

In one exemplary embodiment, measured information is immediately saved so that further processing of the information can occur later, after retrieval of the information by a communication device 235. For further processing, determined by the design of damping device 100, values or constants can be saved in a summary manner for the stored information. Such information may for example include a geometric dimensions, dimensions or distances of the arrangement of sensors 215 and element 225, spring constant or a damping constant. In one embodiment, reference can also be made to such parameters, wherein for example a model, a construction number or a design form of damping device 100 is saved in data memory 210.

A transition from fourth state 320 into first state 315 can occur, so that the first state is allocated to two different distances of sections 105, 110. The correct distance results from state 315-320 and 335, 340 occur. To avoid desynchronization, the processing unit may request information from sensors 215 frequently with the sensors 215 having a sufficiently short reaction time.

An adjustment between state 315-340 and the actual distance may be conducted periodically. If additional elements 225 are provided being mounted along the direction of movement and are suitably spaced apart from one another, additional states 315-340 can be cycled through multiple times, in general as many times as desired. In order to thereby process the established information correctly, more states 315-330 may be provided in another embodiment, so that only one single distance is allocated to each state 315-330.

An expansion movement of damping element 100 in reverse direction can be detected by the cycling sequence of illustrated states 315-330 in second state transitions 340 in clockwise direction.

Figure 4:
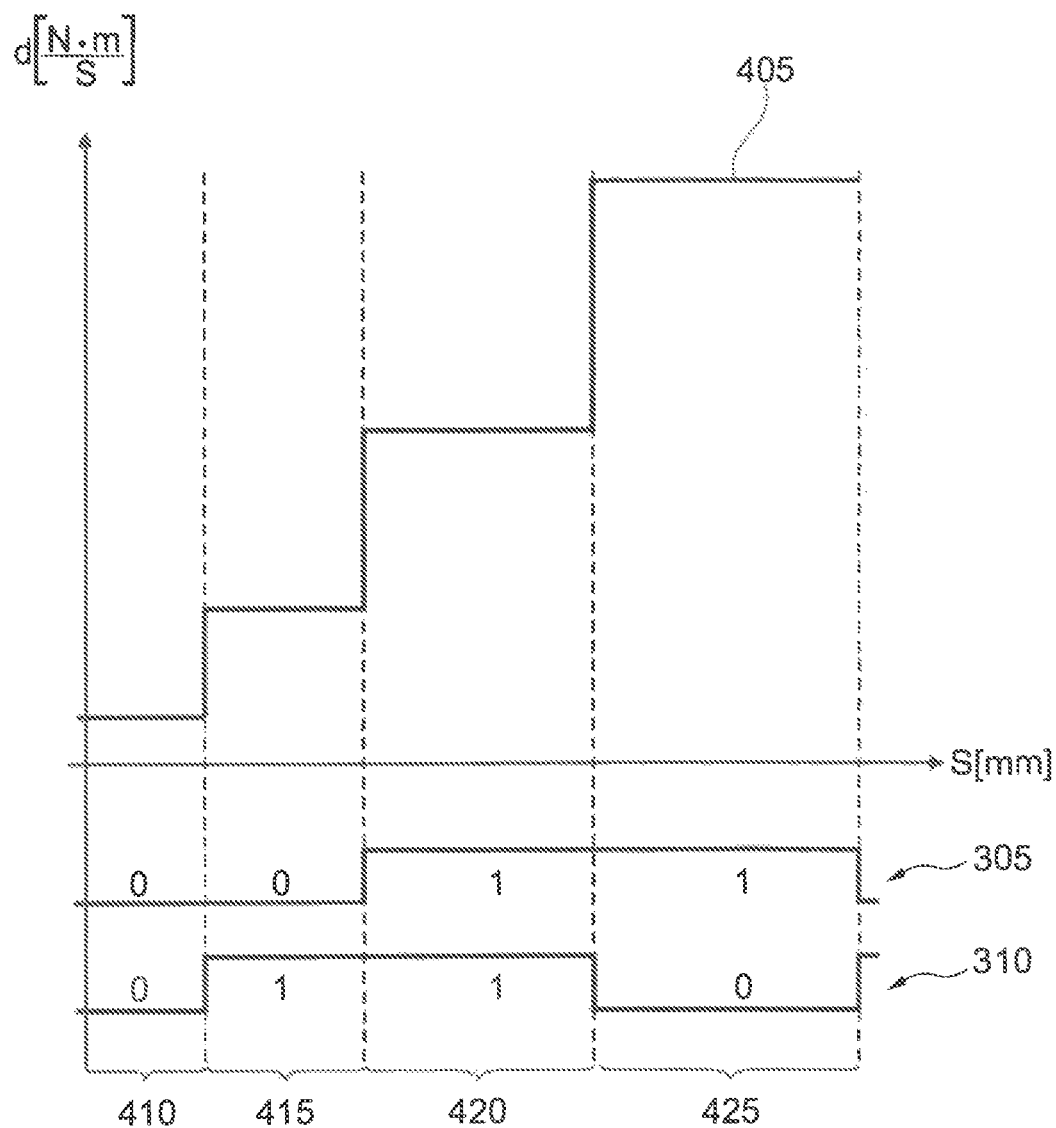
FIG. 4 illustrates sensor values on a damping element.

FIG. 4 shows exemplary sensor values on a damping element 100, as shown in FIG. 1. An exemplary damping constant d is illustrated in a vertical direction and a distance of the first section 105 to second section 110 is shown in a horizontal direction. The distance between sections 105 and 110 increases towards the right if a pulling force onto damping element 100 is considered or decreases if a pushing force is considered. An exemplary progression 405 illustrates a dependency of the damping on a distance at a damping element 100.

Along the distance, four equivalence regions 410, 415, 420 and 425 which abut one another are formed. Damping constant d is constant within each equivalence section 410-425. Basis of the illustration are two sensors 215 which provide output signals 305 or respectively 310 that are illustrated in FIG. 3. Sensors 215 are arranged according to the layout in FIG. 2, so that element 225 in the first equivalence region 410 acts upon none of the sensors 215, in second 415 acts only upon first sensor 215, in third 420 acts upon both sensors 215 and in fourth 425 acts only upon second sensor 215. Sensors 215 and element 225 are positioned on sections 105, 110 so that a change in an output signal of a sensor 215 occurs where the distance of one equivalence region 405-420 transitions into another.

The present equivalence region 410-425 can be determined based on output signals 305, 310 of sensors 215. The energy that has caused the movement of damping element 100 can be defined at least approximately based on the rate of motion and the damping constants in the equivalence regions. The spring force of damping element 100 may also be used in the determination process.

As described above, monitoring system 200 can assume various operational states to which different energy expenditures are allocated. For example, a first operational state may include an idle state wherein the energy expenditure is low wherein only a low processing rate can be achieved. A second operational state may include a processing state in which the energy expenditure is greater as well as the processing rate. More than two operational states may also be supported. Each operational state may have a time allocated to it which is required by the monitoring system in order to again exit this state. Moreover, a requirement or a combination of requirements may be allocated to each operational state which must be met in order to again exit the operational state. In a current microprocessor, such times can be in the μs or ms-range.

Monitoring system 200 can be designed to assume the idle position if no transition of state or transition step 335, 340 occurs over a predefined period of time. The change in state 315-330 via one of the steps 335, 340 can trigger an interrupt, which will move monitoring system 200 out of the idle position into the processing position. The interrupt can be triggered by a rising or falling edge or by a predefined level of an output signal 305, 310. In another embodiment, monitoring system 200 can also request and process output signals 305, 310 periodically in order to determine a change. Such an operation is called "polling". For this purpose, monitoring system 200 can for example exit the idle state in a time-controlled manner and can implement the inquiry in the processing state. A slow inquiry is perhaps also possible in the idle state.

In the processing state, monitoring system 200 can then perform the actual measurement in order to identify a compression, a damping, a deformation or another operating parameter of damping element 100. If no change occurs in the measured values over a predefined time, if output signals 305, 310 do not change over a predefined time, or if output signals 305, 310 assume a predefined pattern over a predefined time, monitoring system 200 can change back into the idle state in order to save energy. The pattern can be present in a predefined idle position of damping element 100, during a compression or deformation that is below a predefined threshold value.

In another exemplary embodiment, a predefined pattern of output signals 305, 310 is predetermined which causes a transition of monitoring system 200 from idle state into processing state. For this purpose, the state of output signals 305, 310 can for example be monitored by a comparator or by hard-wired logic. The comparator can be loaded via microprocessor 255 with a predetermined comparative value and operate digitally. Thus, "waking up" of monitoring system 200 can be coupled to it so that a predetermined waypoint is reached on damping element 100. The waypoint can correspond with a predetermined deformation of damping element 100.

Waking up can also occur if at least the predetermined waypoint has been reached. For this purpose, the above referenced comparator can perform a comparison of "greater or equal to" between the path of the damping element that is represented by output signals 305, 310 and the predetermined bale. The predetermined value in this case is a threshold value which, upon reaching or exceeding can cause activation of the monitoring element.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LISTING

100 Damping element
105 first section
110 second section
115 third section
120 deformable region
200 monitoring system
205 processing unit
210 data memory
215 sensor
220 energy accumulator
225 magnetic element
228 magnet
230 timing unit
235 communication device
240 interphase
245 driver module
250 microcontroller
255 microcomputer
260 interrupt input
265 generator
270 converter
275 coil
280 magnet
285 first carrier element
290 second carrier element
295 interphase
305 first output signal
310 second output signal
315 first state
320 second state
326 third state
330 fourth state
335 first transition
340 second transition
405 first equivalence region
410 second equivalence region
415 third equivalence region
420 fourth equivalence region

What is claimed is:

1. A monitoring system for a damping element on a rail vehicle, the damping element including a first section mounted on the rail vehicle and a second section for introducing a force acting horizontally upon the rail vehicle, the monitoring system comprising:
a sensor mounted on the damping element for sensing a change in a section distance between the first section and the second section;
a data memory;
a processing unit configured to determine information regarding the change in the section distance and to store the information in the data memory; and
a local energy supply device for an autonomous supply of energy for the processing unit, wherein the local energy supply device includes a generator for the supply of electrical energy based on a relative movement of the first section and the second section, wherein the generator is configured for inductive conversion of mechanical energy into electrical energy and includes a coil that is configured for installation on the first section and at least one magnet that is arranged for installation on the second section, wherein a plurality of the at least one magnet and a plurality of the at least one coil are provided and relative distances between the plurality of the at least one magnet are different to relative distances of the plurality of the at least one coil in direction of movement the first section and the second section.

2. The monitoring system according to claim 1, wherein the sensor is configured for determination of a magnetic field and for installation on the first section, and includes a magnet configured for installation on the second section.

3. The monitoring system according to claim 1, wherein the magnet effects the sensor and the coil.

4. The monitoring system according to claim 1, having a first carrier element on which at least one coil and at least one sensor are mounted, wherein the first carrier element is configured for installation on the at least one of the first section and the second section.

5. The monitoring system according to claim 1, wherein the at least one magnet is mounted on a second carrier element, wherein the second carrier element is configured for installation on the at least one of the first section and the second section.

6. The monitoring system according to claim 1, including an energy accumulator configured to temporarily store energy that is supplied by the generator.

7. The monitoring system according to claim 1, including a converter configured to process electrical energy that is provided by the generator.

8. The monitoring system according to claim 1, wherein the damping element is configured to degrade when an energy alters the section distance of the first section and the second section.

9. The monitoring system according to claim 1, wherein the sensor is configured to provide a signal that changes when the section distance between the first section and the second section changes.

10. The monitoring system according to claim 1, including a timing unit, wherein the processing unit is configured to define the information regarding a speed or a point in time of the change in the section distance and to store such in the data memory.

11. The monitoring system according to claim 1, including a communication device configured to provide the information stored in the data memory at an interphase, wherein the processing unit is configured to deactivate the communication device.

12. The monitoring system according to claim 1, wherein at least two operational states with different energy expenditures are supported, wherein a transition between the at least two operational states occurs subject to a signal from the sensor.

13. A monitoring system for a damping element on a rail vehicle, the damping element including a first section mounted on the rail vehicle and a second section for introducing a force acting horizontally upon the rail vehicle, the monitoring system comprising:
   a sensor mounted on the damping element for sensing a change in a section distance between the first section and the second section;
   a data memory;
   a processing unit configured to determine information regarding the change in the section distance and to store the information in the data memory; and
   a local energy supply device for an autonomous supply of energy for the processing unit,
   wherein the sensor is configured to provide a signal that changes when the section distance between the first section and the second section changes, and
   wherein the processing unit includes an interrupt input configured to accept the signal, the signal being a binary signal, wherein the processing unit is configured to move due from an idle state into a processing state to process the information.

14. A monitoring system for a damping element on a rail vehicle, the damping element including a first section mounted on the rail vehicle and a second section for introducing a force acting horizontally upon the rail vehicle, the monitoring system comprising:
   a sensor mounted on the damping element for sensing a change in a section distance between the first section and the second section;
   a data memory;
   a processing unit configured to determine information regarding the change in the section distance and to store the information in the data memory; and
   a local energy supply device for an autonomous supply of energy for the processing unit,
   wherein a damping constant of the damping element is different on a first region, a second region, a third region and a fourth region along a damping element distance,
   wherein the sensor is configured to sense when the damping element distance is exceeded.

15. A monitoring system for a damping element on a rail vehicle, the damping element including a first section mounted on the rail vehicle and a second section for introducing a force acting horizontally upon the rail vehicle, the monitoring system comprising:
   a sensor mounted on the damping element for sensing a change in a section distance between the first section and the second section;
   a data memory;
   a processing unit configured to determine information regarding the change in the section distance and to store the information in the data memory; and
   a local energy supply device for an autonomous supply of energy for the processing unit,
   wherein the sensor is configured to provide a signal that changes when the section distance between the first section and the second section changes, and
   wherein two binary sensors are provided, whose distance-dependent signals are out-of-phase, wherein the processing unit is configured to determine a direction of motion of the first section and the second section based on the signal of the sensor.

* * * * *